United States Patent
Gangakhedkar et al.

(10) Patent No.: US 11,438,807 B2
(45) Date of Patent: Sep. 6, 2022

(54) CLOSED-LOOP CONTROL OF A COMMUNICATION SYSTEM FOR TELEOPERATED DRIVING

(71) Applicant: Huawei Technologies Co., Ltd., Shenzhen (CN)

(72) Inventors: Sandip Gangakhedkar, Munich (DE); Hanwen Cao, Munich (DE); Josef Eichinger, Munich (DE); Ishan Vaishnavi, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 16/859,715

(22) Filed: Apr. 27, 2020

(65) Prior Publication Data

US 2020/0260334 A1 Aug. 13, 2020

Related U.S. Application Data

(63) Continuation of application No. PCT/EP2017/077579, filed on Oct. 27, 2017.

(51) Int. Cl.
*H04W 28/24* (2009.01)
*H04L 41/5009* (2022.01)
(Continued)

(52) U.S. Cl.
CPC ......... *H04W 28/24* (2013.01); *H04L 41/5009* (2013.01); *H04L 41/5051* (2013.01); *H04L 45/302* (2013.01); *H04W 48/18* (2013.01)

(58) Field of Classification Search
CPC .. H04W 28/24; H04W 48/18; H04L 41/5009; H04L 41/5051; H04L 45/302
(Continued)

(56) References Cited

U.S. PATENT DOCUMENTS 8,259,566 B2   9/2012   Chen et al.
8,792,365 B2   7/2014   Chin et al.
(Continued)

FOREIGN PATENT DOCUMENTS

CN   106488555 A   3/2017
CN   107218948 A   9/2017
(Continued)

OTHER PUBLICATIONS

Hosseini et al., "Predictive Safety Based on Track-Before-Detect for Teleoperated Driving Through Communication Time Delay," 2016 IEEE Intelligent Vehicles Symposium (IV), Gothenburg, Sweden, pp. 165-172 (Jun. 19-22, 2016).
(Continued)

*Primary Examiner* — Obaidul Huq
(74) *Attorney, Agent, or Firm* — Leydig, Voit & Mayer, Ltd.

(57) ABSTRACT

A network operator apparatus, a teleoperation application (TOApplication) apparatus, and an apparatus for a teleoperable vehicle are provided. The network operator apparatus creates a network slice for teleoperating the teleoperable vehicle along at least one route, receives a slice configuration request comprising QoS for the at least one route from the TOApplication apparatus, and configures the network slice to support the QoS. The TOApplication apparatus communicates towards the network operator apparatus, a request for creating the network slice, receives a teleoperation service request comprising a set of teleoperation configurations from the teleoperable vehicle, maps each teleoperation configuration to a respective QoS and sends the slice configuration request comprising the QoS to the network operator apparatus. The apparatus for the teleoperable vehicle sends the teleoperation service request to the TOApplication apparatus and controls the route to be followed by (Continued)

the teleoperable vehicle based on information from the TOApplication apparatus.

15 Claims, 8 Drawing Sheets

(51) Int. Cl.
  *H04L 41/5051*   (2022.01)
  *H04L 45/302*    (2022.01)
  *H04W 48/18*     (2009.01)
(58) Field of Classification Search
  USPC .......................................... 370/310, 328, 329
  See application file for complete search history.

(56) References Cited

U.S. PATENT DOCUMENTS

| | | | |
|---|---|---|---|
| 9,494,935 | B2 | 11/2016 | Okumura et al. |
| 9,507,346 | B1 | 11/2016 | Levinson et al. |
| 2007/0064604 | A1 | 3/2007 | Chen et al. |
| 2014/0094178 | A1 | 4/2014 | Eskicioglu et al. |
| 2014/0257695 | A1 | 9/2014 | Annapureddy et al. |
| 2015/0023190 | A1 | 1/2015 | Patel et al. |
| 2016/0139594 | A1 | 5/2016 | Okumura et al. |
| 2016/0146618 | A1* | 5/2016 | Caveney ............... B60W 50/14 701/25 |
| 2018/0287891 | A1* | 10/2018 | Shaw .................... H04W 24/02 |
| 2019/0182884 | A1* | 6/2019 | Deenoo ............... H04W 68/005 |
| 2019/0364492 | A1* | 11/2019 | Azizi .................... H04W 48/16 |

FOREIGN PATENT DOCUMENTS

| | | |
|---|---|---|
| WO | 2009156554 A1 | 12/2009 |
| WO | 2017168112 A1 | 10/2017 |
| WO | 2017174550 A1 | 10/2017 |

OTHER PUBLICATIONS

"3rd Generation Partnership Project; Technical Specification Group Services and System Aspects; Study on enhancement of 3GPP Support for 5G V2X Services (Release 15)," 3GPP TR 22.886 V15.1.0, pp. 1-58, 3rd Seneration Partnership Project, Valbonne, France (Mar. 2017).

"3rd Generation Partnership Project; Technical Specification Group Services and System Aspects; Study on Service Exposure and Enablement Support (SEES) requirements (Release 13)," 3GPP TR 22.853 V13.0.0, pp. 1-24, 3rd Generation Partnership Project, Valbonne, France (Jun. 2014).

"3rd Generation Partnership Project; Technical Specification Group Services and System Aspects; Telecommunication management; Study on management and orchestration of network slicing for next generation network (Release 15)," 3GPP TR 28.801 V15.0.0, pp. 1-78, 3rd Generation Partnership Project, Valbonne, France (Sep. 2017).

* cited by examiner

| System Parameter | Values |
|---|---|
| Teleoperation mode | direct, supervisory, shared |
| Camera settings | {Activated cameras, FPS, Resolution, Scaling factor, # of streams} |
| Sensor settings | {activated sensors, sensor configuration} |
| Haptic feedback | {Haptic feedback type and configuration} |

Teleoperation configuration TCk applicable for duration tk

Fig. 6

| Sub-route | (Coverage Area) | HO Assistance data | Available QoS | Expected duration/length |
|---|---|---|---|---|
| i | A | BS B Assistance data | $QoS_A$ | 3:05 min/0.9 km |
| ii | B | BS C Assistance data | $QoS_B$ | 1:11 min/0.7 km |
| iii | C | BS E Assistance data | $QoS_C$ | 5:45 min/1.7 km |
| iv | E | - | $QoS_E$ | 4:22 min/1.1 km |

Provided by the OMS based on the deployed slice

Fig. 8

CLOSED-LOOP CONTROL OF A COMMUNICATION SYSTEM FOR TELEOPERATED DRIVING

CROSS-REFERENCE TO RELATED APPLICATIONS

This application is a continuation of International Application No. PCT/EP2017/077579, filed on Oct. 27, 2017, the disclosure of which is hereby incorporated by reference in its entirety.

TECHNICAL FIELD

Embodiments of the present disclosure relate to the field of wireless communications, and more particularly to the field of telecommunications systems supporting teleoperated driving.

BACKGROUND

Teleoperated driving (ToD) relies on a cellular network configured to send real-time video streams and sensor data from a vehicle (e.g., a car, a truck, a tractor, a mobile robot, a drone, a device with haptic feedback, and any other movable device) to a remote driver (or a remote operator), and configured to receive driving commands from the remote driver (or a remote operator) to the vehicle. To enable ToD in current and future telecommunication networks, the teleoperation application (hereafter referred to as TOApplication) must be able to configure the appropriate quality-of-service (QoS) requirements for driving in the cellular network. Based on the available QoS, the functionalities or configuration of the TOApplication available along the driving route and the driving-related parameters (e.g., speed, selected route, etc.) must be decided. For example, with four video streams, which may correspond to the front, two sides and rear view of the vehicle and are transmitted on the cellular uplink, the data rate can easily reach tens of megabits per second. However, fluctuations in the available data rate for the TOApplication arising from the time-varying wireless channel may impair the video streams and may thereby compromise the vehicle safety. As a solution to this issue, a mechanism in the TOApplication may be required to translate a teleoperation configuration (hereafter referred to as TeleConfiguration (TC)) into appropriate QoS requirements which are understood by the cellular network. The TC comprises the hardware and software settings of the teleoperation system components, such as, for example, the configuration of cameras and/or video streams, additional sensors like LiDARs or Ultrasound sensors, and haptic feedback configurations. The TC maps directly to a QoS requirement on the communication system and this mapping is based on the hardware and software capabilities of the aforementioned teleoperation system components. Hence, this mapping is likely to be dependent on the teleoperation system components in the vehicle.

However, these appropriate QoS requirements are on a per-vehicle basis, whereas a slice created by the network operator (e.g., an operator management system (OMS)) is on a per-application basis or a per-end-customer basis, a slice being defined as a collection of network functions and resources for these network functions which are orchestrated in order to meet the requirements (e.g., in terms of QoS) of a service to be provided by the slice (3GPP TR 28.801). Therefore, there needs to be a way for the network operator to combine the expected use of the vehicles and their individual time-dependent and route-dependent QoS requirements to an overall QoS requirement that is instantiated for the slice.

Once the slice has been instantiated with the specific QoS parameters and handed back to the TOApplication by the network operator, the latter needs to continue monitoring the slice in order to see if the provisioned QoS parameters are met along the path covered by the vehicle. The problem is that, if the provisioned QoS parameter cannot be met, then the TOApplication will use the wrong TC to drive the vehicle resulting in bad driving experience at the least, and in safety hazards at the worst. Hence, there is a need for the network operator to inform the TOApplication proactively of changes in the provisioned QoS parameters and to provision acceptable alternative QoS parameters in order to ensure safe teleoperated driving.

Document U.S. Pat. No. 9,507,346-B1 discloses a teleoperation system and method for trajectory modification of autonomous vehicles, which is related to a core control system for ToD. However, this document remains silent about an impact of the communication system performance and QoS parameters.

Document U.S. Pat. No. 9,494,935-B2 discloses a remote operation of autonomous vehicle in an unexpected environment, wherein vehicle sensors can capture data about the vehicle and the unexpected driving environment. The captured data can include not only feedback images, but also radar and lidar data. The captured data can be sent to a remote operator. The remote operator can manually operate the vehicle remotely or issue commands to the autonomous vehicle to be executed by on various vehicle systems.

The conference paper entitled: A. Hosseini, M. Lienkamp, "Predictive safety based on track-before-detect for teleoperated driving through communication time delay", 2016 IEEE Intelligent Vehicles Symposium, discloses a vehicle predicting the future trajectory of dynamic objects using a track-before-detect technique, wherein the communication time delay is compensated through a prediction of hazards, keeping the human operator as the main decision maker in the control loop. However, this document remains silent about a compensation and a prediction of the communication link quality.

Document U.S. Pat. No. 8,259,566-B2 discloses a closed-loop QoS system, which collects real-time network KPIs (key performance indicators) at the physical, data link and network layers, and dynamically controls the network traffic in order to achieve improved performance according to the priority and policy defined by a user. The closed-loop QoS system monitors jitter and bandwidth in order to only adapt the networking infrastructure by dynamically reallocating bandwidth to the communication link. However, this document remains silent about a change of the ToD configuration or the paths to adapt to the network condition in real time.

SUMMARY

It is therefore an objective of the present disclosure to provide a telecommunications system supporting teleoperated driving, in particular by considering both the network and vehicular domains and their interworking in order to guarantee the communication quality-of-service (QoS) during the whole driving process and geographical route.

According to a first aspect, the disclosure relates to a network operator (OMS), which may be configured to create a network slice for teleoperating a teleoperable vehicle (v) along at least one route (R), to receive, from a teleoperation application (TOApplication) a slice configuration request comprising a quality-of-service (QoS) for the at least one route (R), and to configure the network slice to support the QoS for the at least one route (R).

According to an implementation form of the first aspect, the network operator (OMS) may be configured to monitor the network slice by monitoring performance indicators (KPIs) corresponding to the required QoS.

According to a further implementation form of the first aspect, the network operator (OMS) may be configured to notify the TOApplication about the network slice, in particular about one or more parameters of the network slice. For example, the parameters may be changes in QoS related to a vehicle or be related to the configuration of the network slice itself.

According to a further implementation form of the first aspect, the network operator (OMS) may comprise a prediction module and may be configured to gather, at the prediction module, ongoing and/or historical monitoring data of the network slice, to predict a change in the QoS supported by the network slice, based on the ongoing and/or historical monitoring data of the network slice, and to notify the TOApplication about the predicted change.

The above objective is also solved in accordance with a second aspect.

According to the second aspect, the disclosure relates to a teleoperation application (TOApplication), which may be configured to communicate, towards a network operator (OMS), in particular as claimed in the first aspect and/or any one of the implementation forms of the first aspect, a request for creating a network slice for teleoperating a teleoperable vehicle (v) along at least one route (R), to receive a teleoperation service request from the teleoperable vehicle (v), wherein the teleoperation service request comprises a set (TC) of teleoperation configurations (tck), to map each teleoperation configuration (tck) to a respective QoS, and to send a slice configuration request to the OMS comprising the QoS. The TOApplication may be located in the network and may, for example, be decentralized and run on different entities in the network.

According to an implementation form of the second aspect, the set (TC) of teleoperation configurations (tck), in particular each teleoperation configuration (tck) of the set (TC), may be valid for a pre-defined time period.

According to a further implementation form of the second aspect, the teleoperation application (TOApplication) may be configured to receive, from the network operator (OMS), a notification about the network slice, in particular as specified in a further implementation form of the first aspect.

According to a further implementation form of the second aspect, the teleoperation application (TOApplication) may be configured to receive, from the network operator (OMS), a notification about a predicted change, in particular as specified in a further implementation form of the first aspect.

The above objective is also solved in accordance with a third aspect.

According to the third aspect, the disclosure relates to an application for a teleoperable vehicle (v). The application may be configured to send a teleoperation service request towards a teleoperation application (TOApplication), and to control a route (R) to be followed by the teleoperable vehicle (v), based on information from the TOApplication.

According to an implementation form of the third aspect, the teleoperation service request may comprise a set (TC) of teleoperation configurations (tck).

The above objective is also solved in accordance with a fourth aspect.

According to the fourth aspect, the disclosure relates to a method, which is performed by a network operator (OMS) and may comprise the step of creating a network slice for teleoperating a teleoperable vehicle (v) along at least one route (R), the step of receiving, from a teleoperation application (TOApplication) a slice configuration request comprising a quality-of-service (QoS) for the at least one route (R), and the step of configuring the network slice to support the QoS for the at least one route (R).

According to an implementation form of the fourth aspect, the method may comprise the step of monitoring the network slice by monitoring performance indicators (KPIs) corresponding to the required QoS.

According to a further implementation form of the fourth aspect, the method may comprise the step of notifying the TOApplication about the network slice, in particular about one or more parameters of the network slice.

According to a further implementation form of the fourth aspect, the method may comprise the step of gathering, at the prediction module, ongoing and/or historical monitoring data of the network slice, the step of predicting a change in the QoS supported by the network slice, based on the ongoing and/or historical monitoring data of the network slice, and the step of notifying the TOApplication about the predicted change.

The above objective is also solved in accordance with a fifth aspect.

According to the fifth aspect, the disclosure relates to a method, which is performed by a teleoperation application (TOApplication) and may comprise the step of communicating, towards a network operator (OMS), in particular as specified in the first aspect and/or any one of the implementation forms of the first aspect, a request for creating a network slice for teleoperating a teleoperable vehicle (v) along at least one route (R), the step of receiving a teleoperation service request from the teleoperable vehicle (v), wherein the teleoperation service request comprises a set (TC) of teleoperation configurations (tck), the step of mapping each teleoperation configuration (tck) to a respective QoS, and the step of sending a slice configuration request to the OMS comprising the QoS.

According to an implementation form of the fifth aspect, the method may comprise the step of receiving, from the OMS, a notification about the network slice, in particular as specified in a further implementation form of the first aspect.

According to a further implementation form of the fifth aspect, the method may comprise the step of receiving, from the OMS, a notification about the predicted change, in particular as specified in a further implementation form of the first aspect.

The above objective is also solved in accordance with a sixth aspect.

According to the sixth aspect, the disclosure relates to a method, which is performed by an application for a teleoperable vehicle (v) and may comprise the step of sending a teleoperation service request towards a teleoperation application (TOApplication), and the step of controlling a route (R) to be followed by the teleoperable vehicle (v), based on information from the TOApplication.

The above objective is also solved in accordance with a seventh aspect.

According to the seventh aspect, the disclosure relates to a computer readable storage medium storing program code thereon for use by any one of a network operator (OMS), a teleoperation application (TOApplication) and an application for a teleoperable vehicle (v), the program code comprising instructions for executing a method according to any one of the fourth aspect when used by the network operator (OMS), the fifth aspect when used by the teleoperation application (TOApplication), the sixth aspect when used by the application for the teleoperable vehicle (v) and their respective implementation forms. Thereby, the method can be performed in an automatic and repeatable manner.

The computer program can be performed by the above apparatuses.

More specifically, it should be noted that all the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

It shall further be understood that a preferred embodiment of the disclosure can also be any combination of the dependent claims or above embodiments with the respective independent claim.

These and other aspects of the disclosure will be apparent and elucidated with reference to the embodiments described hereinafter.

BRIEF DESCRIPTION OF THE DRAWINGS

In the following detailed portion of the present disclosure, embodiments will be explained in more detail with reference to the exemplary embodiments shown in the drawings, in which:

FIG. 6 shows system configuration parameters and their associated values, according to an embodiment of the present disclosure;

FIG. 8 shows a table summarizing network configuration information on which a negotiated/guaranteed/reserved QoS configuration is based, according to an embodiment of the present disclosure.

Identical reference signs are used for identical or at least functionally equivalent features.

DETAILED DESCRIPTION OF EMBODIMENTS

Slicing is based on the requirement of being able to provide different services to different users over the same physical infrastructure. Hence, the physical infrastructure is "sliced" to different architectures and services. Teleoperated driving (ToD) presents a new use case for slicing, which requires the ability of the slice management to support strict time-bound and route-dependent QoS requirements from one or more requesting application nodes, to predict the QoS in a specific coverage area for the slice and to recommend changes in the QoS in the coverage area to the TOApplication.

Figure 1:
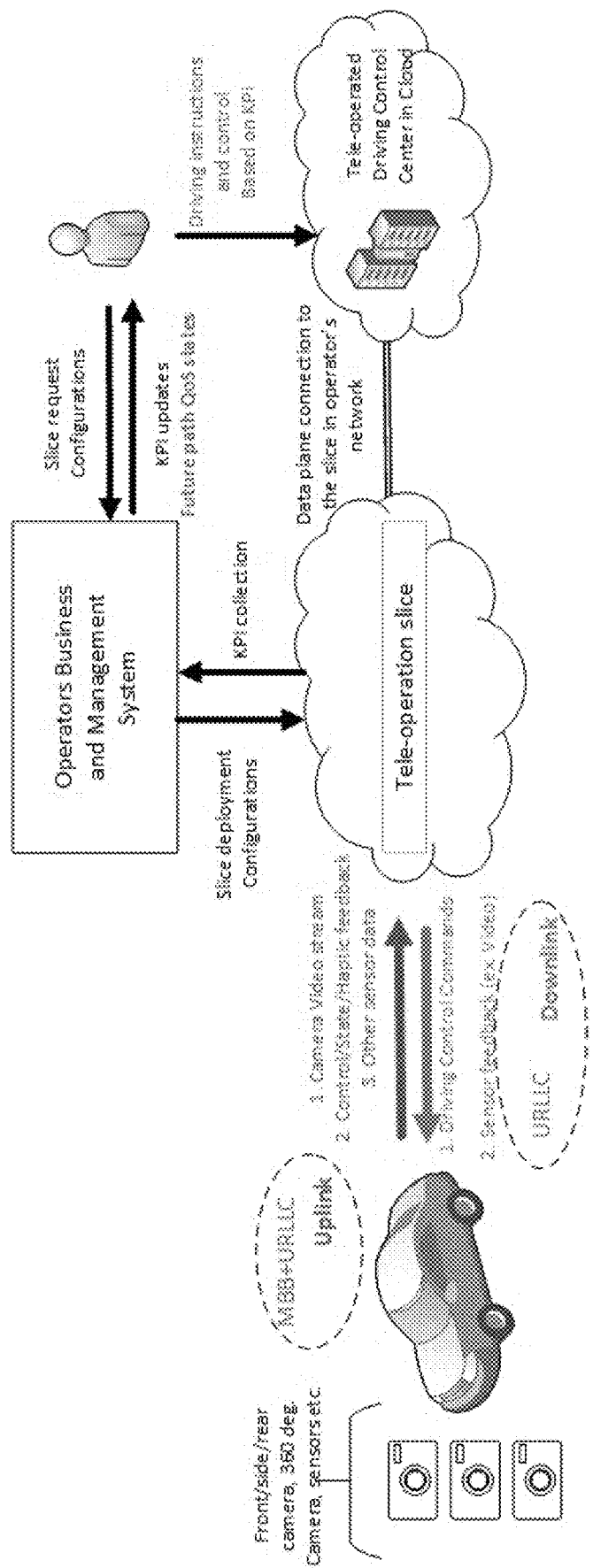
FIG. 1 shows a schematic view of a telecommunications system 100 comprising a network slice (depicted as teleoperation slice) used for teleoperated driving, according to an embodiment of the present disclosure.

FIG. 1 shows a schematic view of a telecommunications system 100 comprising a network slice used for teleoperated driving, according to an embodiment of the present disclosure.

As can be seen, the system 100 within a cellular network consists of a network slice (depicted as teleoperation slice) for teleoperated driving a teleoperable vehicle along a route or path, the slice configuration of which has been done according to the aggregate QoS requirements in the form of at least one amongst the total data rate, the mean and maximum latency, the mean and minimum network availability and reliability provided by the teleoperation service provider (TSP).

Figure 2:
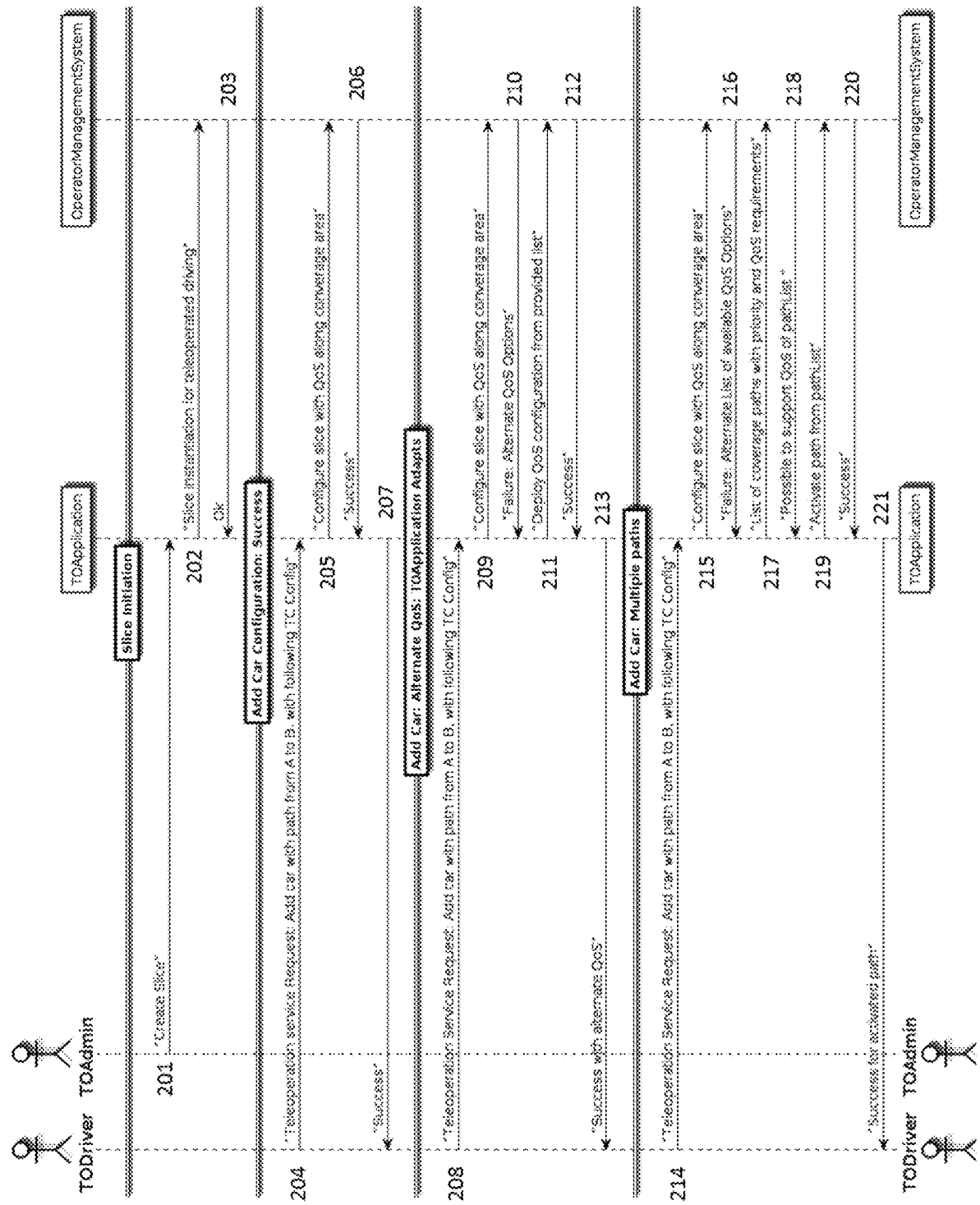
FIG. 2 shows a message sequence chart (MSC) illustrating a first phase during which a network slice is initiated and a second phase during which the initiated network slice is configured to support a QoS following three possible scenarios, according to an embodiment of the present disclosure.

FIG. 2 shows a message sequence chart (MSC) illustrating a first phase during which a network slice is initiated and a second phase during which the initiated network slice is configured to support a QoS following three possible scenarios, according to an embodiment of the present disclosure.

In the following, it will be considered teleoperated driving, in particular the case of a point-to-point teleoperated driving, in which a teleoperable vehicle (vi) (e.g., a teleoperable car, truck, tractor, mobile robot, drone, device with haptic feedback, and any other teleoperable movable device) requires a teleoperation service requesting to use teleoperation in order to be remotely driven from point A to point B along a candidate path (R) or geographical route (R) amongst other candidate ones.

The first phase of the network slice starts with step 201, in which a teleoperation administrator entity (TOAdmin) of the TSP sends a request to create a dedicated network slice towards the TOApplication located in the network. The TOApplication may, for example, be decentralized and run on different entities in the network. The TOAdmin is the administrator of the TOApplication, which is responsible for the correct functioning of the TOApplication. In step 202, in response to the received request from the TOAdmin, the TOApplication sends a request to instantiate the network slice for teleoperated driving towards the network operator (e.g., an operator management system-OMS). In step 203, once the instantiation has been successfully achieved, the network operator sends a success message (depicted as "Ok") towards the TOApplication.

The second phase can start once the network slice has been initiated, namely once the network slice has been created and instantiated for teleoperated driving. The second phase starts when a user (e.g., a driver, which is hereafter denoted as TODriver, or a navigation/over-the-top (OTT) software) of the teleoperable vehicle requires a teleoperation service by inputting the desired start point (A) and end point (B). A third-party application (e.g., the navigation/over-the-top (OTT) software) then derives p initial candidate geographical routes ($R_{1vi}, R_{2vi}, \ldots, R_{jvi}, \ldots, R_{pvi}$) together with a route-specific teleoperation configuration (TC). Alternatively, the route-specific TC may be generated by the TODriver software in the teleoperable vehicle based on at least one input from the OTT software, such as candidate geographical routes, estimated vehicle traffic along each route, road and weather conditions, amongst others. Each teleoperable vehicle (vi) has a TC set ($T_{vi}$) of $k_{vi}$ supported TCs ($tc_{1vi}, tc_{2vi}, \ldots, tc_{jvi}, \ldots, tc_{kvi}$), such that $T_{vi} = \{tc_{1vi}, tc_{2vi}, \ldots, tc_{jvi}, \ldots, tc_{kvi}\}$, denotes the system configuration parameters that are available or supported for a TC-specific duration ($t_{1vi}$) in order to achieve a route-specific teleoperation driving. These system configuration parameters of assistance driving may, for example, comprise a teleoperation mode, camera settings, sensor settings and haptic feedback settings amongst others.

For the second phase, the first, second and third scenarios are described by the steps 204 to 207, 208 to 213, and 214 to 221, respectively.

In any of steps 204, 208 and 214, the TODriver requiring the teleoperation service sends a teleoperation service request towards the TOApplication, for which it has signed up. The teleoperation service request may comprise a candidate path ($R_{jvi}$) or geographical route ($R_{jvi}$) from point A to point B accompanied with the corresponding TC set ($T_{vi}$) for the teleoperable vehicle (vi).

In any of steps 205, 209 and 215, the TOApplication firstly converts the received TC set, $T_{vi}$, where $T_{vi} = \{tc_{1vi}, tc_{2vi}, \ldots, tc_{jvi}, \ldots, tc_{kvi}\}$, to a QoS set, $Q_{vi}$, where $Q_{vi} = \{q(tc_{1vi}), q(tc_{2vi}), \ldots, q(tc_{jvi}), \ldots, q(tc_{kvi})\}$, using a TC-to-QoS mapping function (q). Indeed, each TC ($tc_{jvi}$) has requirements on throughput, latency and reliability, which are aggregately referred to as a required QoS of that TC ($tc_{jvi}$) and are denoted by q(tc_jvi). Thus, $Q_{vi}$ is the set of required QoS for all TCs ($tc_{1vi}, tc_{2vi}, \ldots, tc_{jvi}, \ldots, tc_{kvi}$) in the TC set, $T_{vi}$, specific to the i-th teleoperable vehicle (vi).

Each geographical route (R) in a service area is divided into m sections (r) according to the respective QoS set ($Q_{vi}$) required along each section. Thus, for the i-th teleoperable vehicle (vi), the j-th geographical route ($R_{jvi}$) is segmented into m sections ($r_{1jvi}, r_{2jvi}, \ldots, r_{jjvi}, \ldots, r_{mjvi}$) according to the required QoS ($Q_{vi}^{rjjvi}$) along the j-th section ($r_{jjvi}$), such that $Q_{vi}^{rjjvi}$ is a subset of $Q_{vi}$ and the required QoS ($Q_{vi}^{Rjvi}$), where $Q_{vi}^{Rjvi} = \{Q_{vi}^{r1jvi}, \ldots, Q_{vi}^{rjjvi}, \ldots, Q_{vi}^{rmjvi}\}$ is the set of the QoS required along the whole geographical route ($R_{jvi}$), i.e., along all m sections ($r_{1jvi}, r_{2jvi}, \ldots, r_{jjvi}, \ldots, r_{mjvi}$) of the geographical route ($R_{jvi}$).

Once the received TC set ($T_{vi}$) has been converted to the QoS set ($Q_{vi}$), the TOApplication secondly sends, towards the network operator (e.g, OMS), a slice configuration request accompanied with the corresponding QoS set ($Q_{vi}^{rjjvi}$) for the teleoperable vehicle (vi) and the geographical route ($R_{jvi}$). The slice configuration request may comprise, in particular, a prioritized list of QoS sets $\{Q_{vi}^{Rjvi}\}$, each set corresponding to a geographical route $R_{jvi}$. The network operator (e.g., OMS) may be adapted to continuously monitor the network slice, thereby allowing to verify its correct functioning in real time, and adapted to configure the monitored network slice (i.e., adapted to reserve or support the required QoS) for at least one of the candidate geographical routes $R_{jvi}$. To do so, the monitoring system inside the network operator (e.g., OMS) monitors the upcoming performance indicators, e.g., key performance indicators (KPIs) corresponding to the required QoS, for all the teleoperable vehicles (vi) that are currently driving. In a simple manner, this may be done by monitoring the overall network slice performance.

In the first scenario of the second phase (steps 204 to 207), these monitored performance indicators (e.g., KPIs) corresponding to the required QoS can be met such that the network operator (e.g., OMS) can configure the created and instantiated network slice to support the corresponding QoS set ($Q_{vi}^{Rjvi}$) by reserving the required QoS for at least one of the candidate geographical routes $R_{jvi}$. An acknowledgment of successful configuration may then be sent from the network operator (e.g., OMS) towards the TOApplication in step 206, before being relayed by the TOApplication towards the TODriver in step 207.

Figure 3:
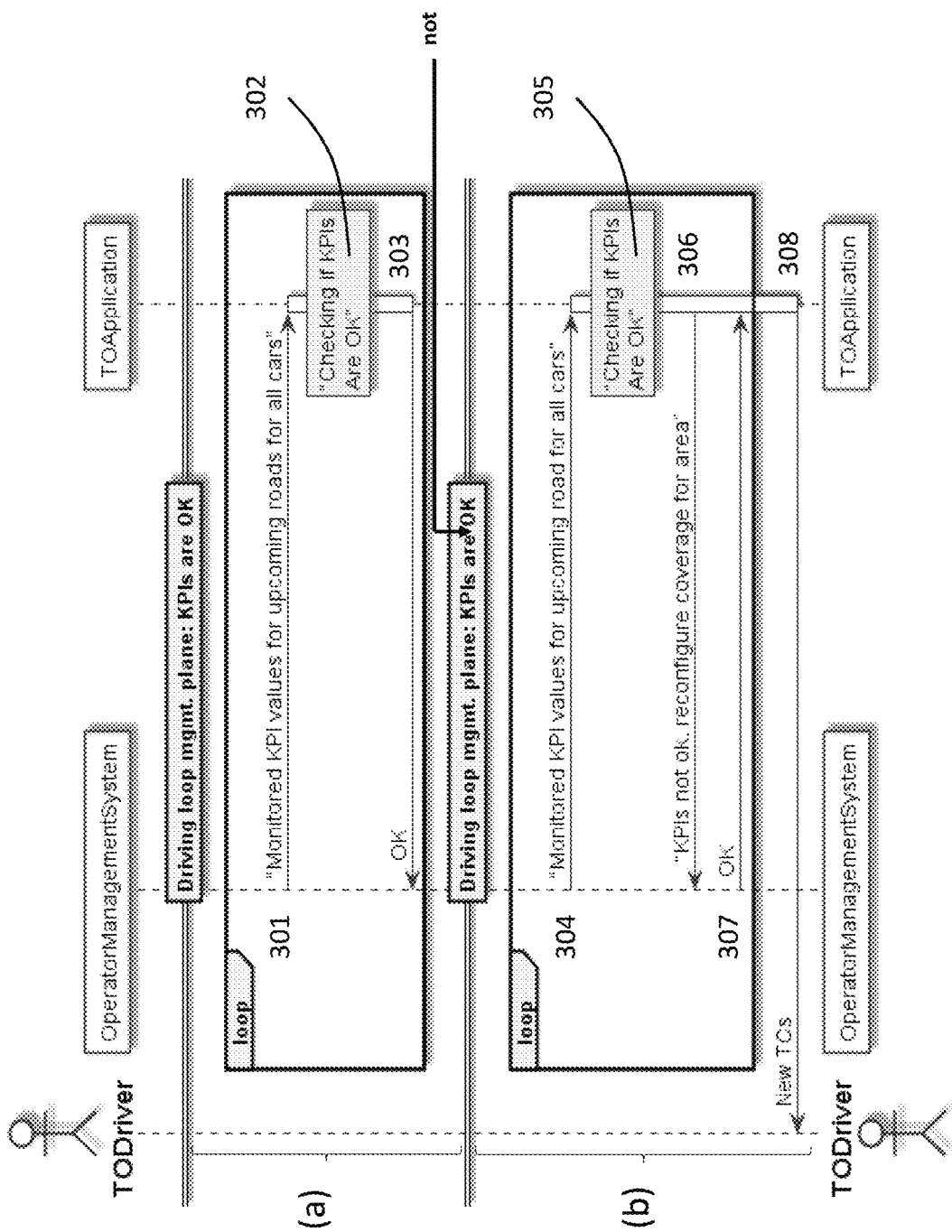
FIG. 3 shows a network-aware driving feedback loop between a network operator (depicted as OMS) and a TOApplication when monitored performance indicators (e.g., KPIs) cannot be met any longer and during which (a): no slice reconfiguration is requested from the TOApplication and (b): a slice reconfiguration is requested from the TOApplication, according to an embodiment of the present disclosure.

In the second and third scenarios of the second phase (steps 208 to 213 and 214 to 221, respectively), these monitored performance indicators (e.g., KPIs) corresponding to the required QoS can no longer be met, and a negotiation phase between the network operator (e.g., OMS) and the TOApplication may then begin through a network-aware driving feedback loop, as illustrated in FIG. 2 (steps 210 and 211 for the second scenario and steps 216 to 218 for the third scenario), FIG. 3(a) (steps 301 to 303 for the second scenario) and FIG. 3(b) (steps 304 to 307 for the third scenario). The network operator (e.g., OMS) may notify the TOApplication by sending, in steps 210, 301 (for the second scenario) and 216, 304 (for the third scenario), a failure message along with the monitored performance indicators (e.g., KPIs) that cannot be met any longer.

In step 302, the TOApplication checks these monitored performance indicators (e.g., KPIs) and if the TOApplication does not have any immediate teleoperable vehicles that are influenced by these monitored performance indicators (e.g., KPIs), the TOApplication may decide to adapt its teleoperation service request to the QoS set that can be met by the monitored performance indicators (e.g., KPIs) by keeping the network slice as it is configured, and may notify the network operator (e.g., OMS) of its decision in steps 211 and 303. Then, an acknowledgment of successful configuration is sent from the network operator (e.g., OMS) towards the TOApplication in step 212, before being relayed by the TOApplication towards the TODriver in step 213.

In step 305, the TOApplication may check these monitored performance indicators (e.g., KPIs) and if the TOApplication has some immediate teleoperable vehicles that are influenced by these monitored performance indicators (e.g., KPIs), the TOApplication may ask, in steps 217, 306, for the network operator (e.g., OMS) to reconfigure the network slice with a new QoS set in order to support the QoS set corresponding to these monitored performance indicators (e.g., KPIs). The new QoS set may be provided by the TOApplication based on a list of coverage paths or routes with corresponding priority and QoS requirements, so that the TOApplication may thus redirect teleoperable vehicles in accordance with these monitored performance indicators (e.g., KPIs). In step 218, the network operator (e.g., OMS) may then notify the TOApplication of its possibility to configure the network slice with new QoS sets associated to the coverage paths of the provided list.

In step 219, the TOApplication may select a path or route from the provided list and may ask for the network operator (e.g., OMS) to configure the network slice for the selected path or route, thereby activating the selected path. Then, an acknowledgment of successful configuration or successful path activation may be sent from the network operator (e.g., OMS) towards the TOApplication in steps 220, 307, and the TOApplication may relay the acknowledgment along with the new TC set associated to the selected path or route towards the TODriver in steps 221, 308.

Figure 4:
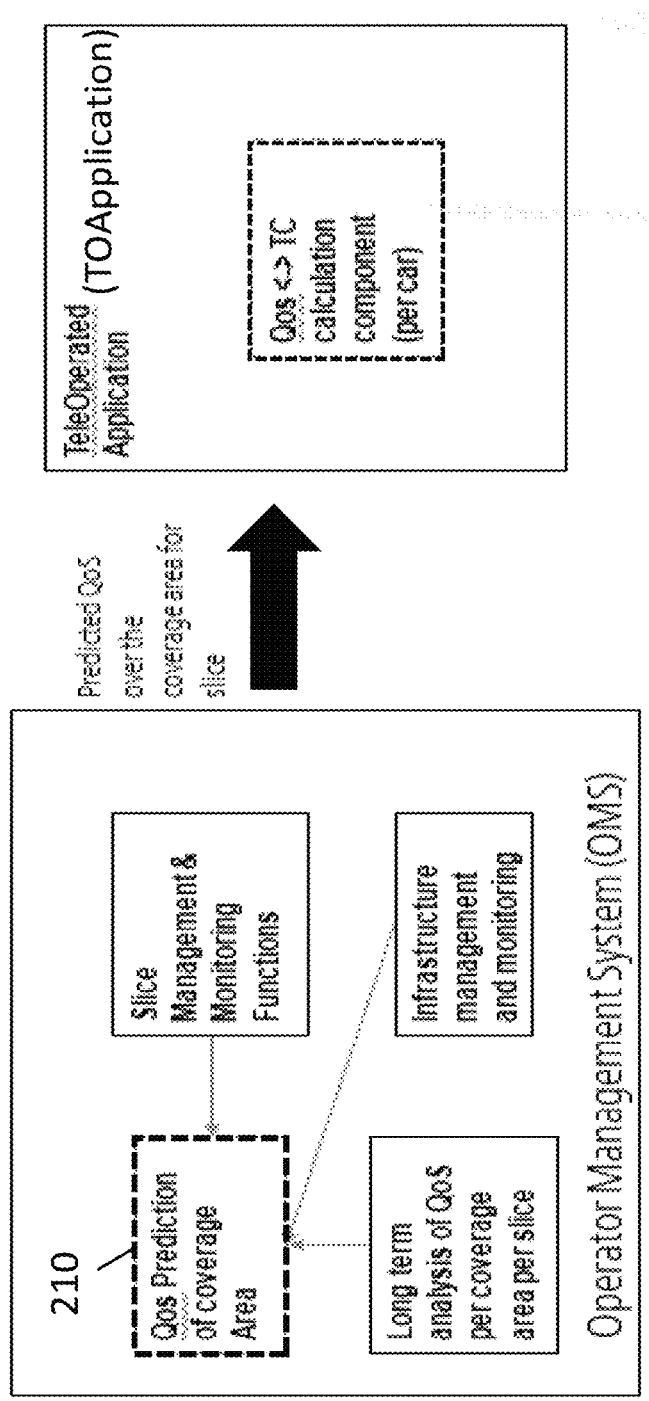
FIG. 4 illustrates the monitoring and signaling of a QoS prediction by the OMS in a coverage area of the network slice, according to an embodiment of the present disclosure.

As shown in FIG. 4, the network operator (e.g., OMS) may additionally comprise a prediction module 210, which gathers current management and monitoring data on the network slice and the network infrastructure as well as historical monitoring data from a long-term analysis of QoS per coverage area per slice in order to carry out QoS predictions on a per-slice basis over the coverage area of the network slice. The predicted QoS is reported to the TOApplication, which converts it to TC using an inverse TC-to-QoS mapping function. Thereby, the TOApplication can in advance adapt the driving conditions or ask for a change in the coverage area of the network slice.

Figure 5:
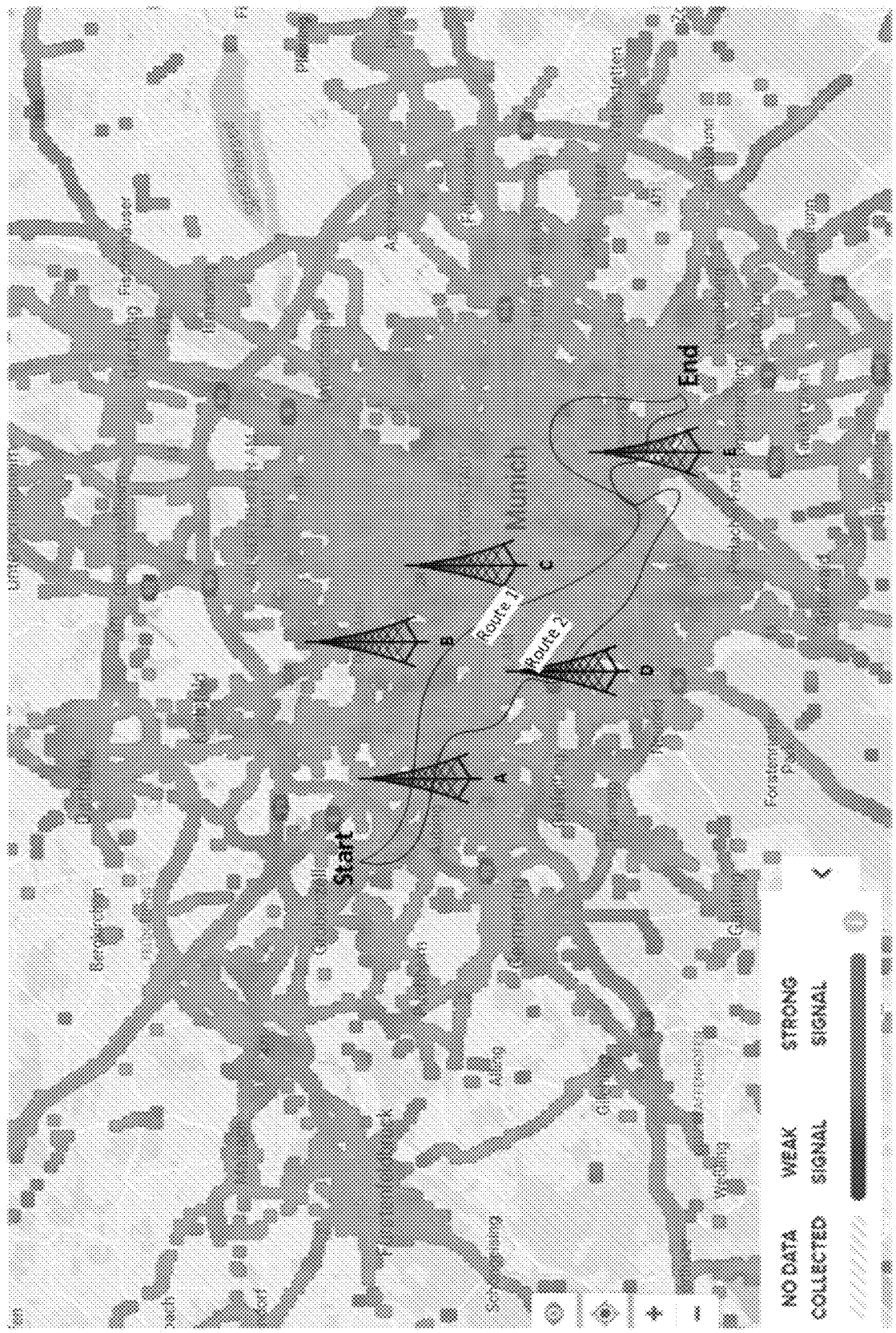
FIG. 5 shows a geographical map illustrating a point-to-point teleoperated driving of a teleoperable vehicle (v) along two candidate geographical routes (Route 1, Route 2), according to an embodiment of the present disclosure.

For illustrative purposes, the present disclosure may be described in the case of a point-to-point teleoperated driving, in which a teleoperable vehicle (v) (e.g., a teleoperable car, truck, tractor, mobile robot, drone, device with haptic feedback, and any other teleoperable movable device) needs to be driven by teleoperation from a start point to an end point along two candidate geographical routes (denoted as "Route 1" and "Route 2"), as depicted in FIG. 5.

To do so, a user (e.g., a driver or a navigation/over-the-top (OTT) software) of the teleoperable vehicle inputs the desired start point and end point. A third-party application (e.g., the navigation/over-the-top (OTT) software) then derives a set of two prioritized candidate geographical routes, i.e., Route 1 and Route 2, together with their respective teleoperation configuration (TC).

The procedure of teleoperated driving being specific to each candidate geographical route, Route 1 is assumed to have priority over Route 2, and is thereby selected first.

Referring to FIG. 6 showing the system configuration parameters and their associated values, the system configuration parameters of assistance driving may comprise a teleoperation mode, camera settings, sensor settings and haptic feedback settings amongst others.

Figure 7:
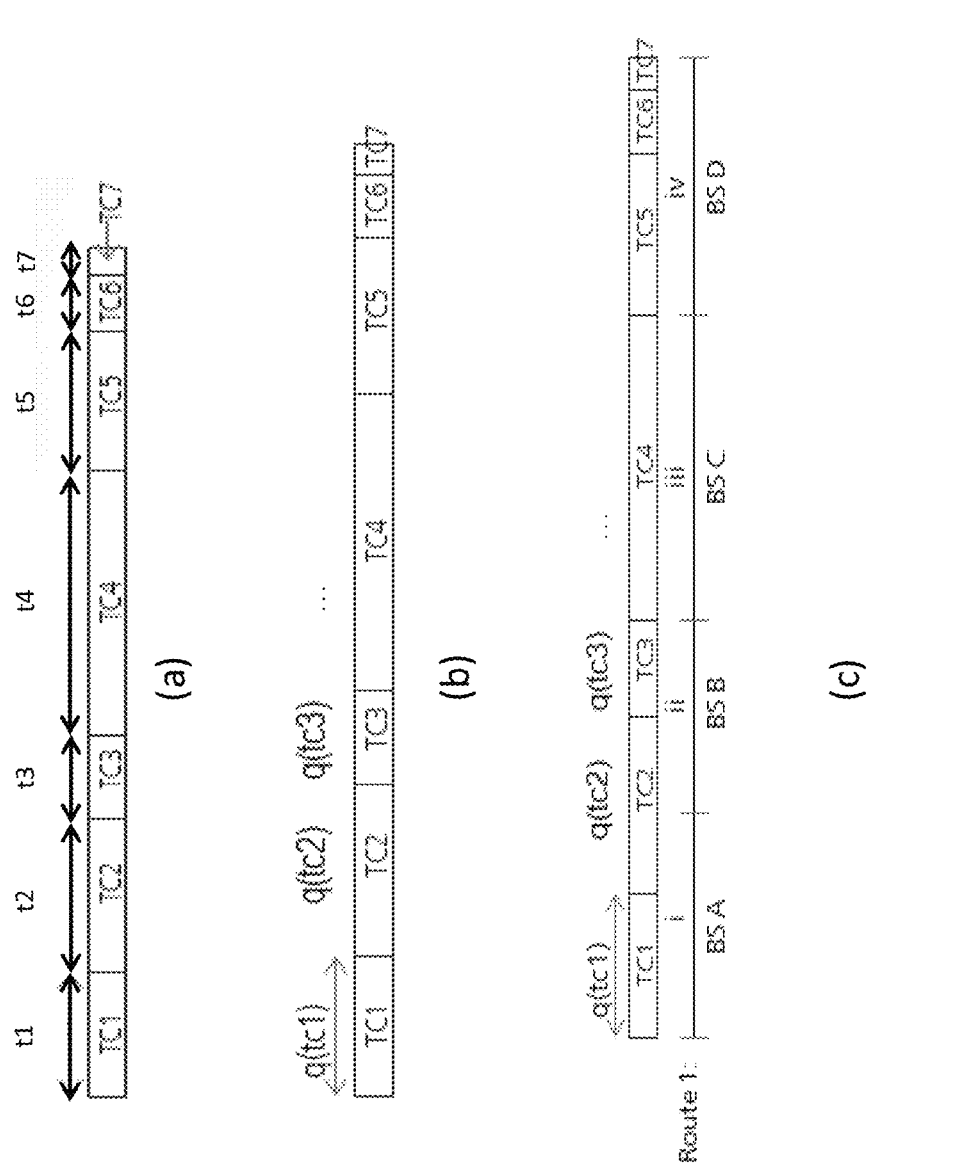
FIG. 7 illustrates a schematic representation of (a): a formatting of a TC set ($T_v$) of seven supported TCs along a geographical route, having each a respective t duration, (b): a respective TC-to-QoS mapping using a q function, and (c): an available time-bound QoS per BS for each sub-route along the selected Route 1, according to an embodiment of the present disclosure.

In the present exemplary embodiment, the teleoperable vehicle (v) has a TC set ($T_v$) consisting of at least seven supported TCs which are depicted as TC1, TC2, . . . , TC7 in FIG. 7(*a*), such that $T_v=\{TC1, TC2, \ldots, TC7\}$. TC1, . . . , TC7 from the TC set ($T_v$) are overlaid on the selected Route 1 and are part of the teleoperation service request which is sent from the TODriver towards the TOApplication located in the network, in order to achieve the teleoperated driving. Each TC is allocated a respective t duration, where $t=\{t1, t2, \ldots, t7\}$, t1 being the duration of TC1, t2 being the duration of TC2, . . . , and t7 being the duration of TC7.

The TOApplication translates the teleoperation service request to a teleoperation service configuration request, and more specifically to QoS requirements along the coverage area using a TC-to-QoS mapping function (q). Thus, each TC of the TC set ($T_v$) is mapped to a respective QoS, such that the overall QoS set (Qv) for Route 1 can be defined by $\{q(tc1), q(tc2), \ldots, q(tc7)\}$, where q(tc1) is the QoS of TC1, q(tc2) is the QoS of TC2, . . . , and q(tc7) is the QoS of TC7, as depicted in FIG. 7(*b*).

The teleoperation service configuration request, and more specifically the overall QoS set (Qv) for Route 1, is then sent towards the network operator (e.g., OMS), which provides its negotiated, guaranteed and/or reserved QoS configuration along the selected geographical route (i.e., Route 1) to the TOApplication.

Referring to FIG. 7(*c*), the negotiated/guaranteed/reserved QoS configuration may be based on network configuration information from, for example, the OMS database, and be more specifically based on the sequence of base stations (BSs) along the selected Route 1 and on relevant handover (HO) information. The HO information may comprise a HO sequence, HO assistance data and negotiated QoS information. The HO sequence may be defined as {BS A→BS B→BS C→BS E} and allows to determine the coverage area (A→B→C→E) of the network slice deployment; the HO assistance data per BS may include Cell/Connection-IDs, HO parameters and an expected duration of service interruption; the negotiated QoS information may include, for each BS, a time-bound QoS requirement (e.g., an expected duration/length of the reserved resources) in terms, for example, of uplink/downlink (UL/DL), throughput, reliability and mean latency, based on the network slice configuration.

FIG. 8 shows a table summarizing network configuration information on which a negotiated/guaranteed/reserved QoS configuration is based, according to an embodiment of the present disclosure. This network configuration information, and in particular the available QoS per BS for each sub-route (depicted in FIG. 7(*c*) by the segments: i, ii, iii and iv) of the selected Route 1, is provided by the network operator (e.g., OMS) based on the deployed network slice towards the TOApplication, which in turn relays it towards the TODriver.

The above procedure is repeated for each candidate geographical route (i.e., for Route 2 in the present exemplary embodiment). Then, the final selection of the geographical route amongst all candidate geographical routes may be performed by the TOApplication or the TODriver, and afterwards transmitted towards the network operator (e.g., OMS) which configures the network slice accordingly. Along the geographical route, if the network operator (e.g., OMS) detects that it cannot maintain the desired QoS, the network-aware driving feedback loop as performed in the second and third scenarios of the second phase is then triggered to regenerate new routes and associated QoS configurations in real time, thereby ensuring that the TOApplication always runs with a known and satisfactory QoS configuration.

Finally, the present disclosure is based on a telecommunications system capable of supporting teleoperated driving.

A teleoperation service request, which is sent from a teleoperable user or vehicle (e.g., TODriver) towards a teleoperation application (TOApplication) located in the network, comprises a route-specific teleoperation configuration (TC) set ($T_v$) that is formatted in a time-bound manner as multiple segmented candidate paths or geographical routes along a coverage area.

A network-aware driving feedback loop across the TOApplication and a 5G network operator (e.g., OMS) allows the provision of available QoS requirements between the TOApplication and the network operator (e.g., OMS), while allowing the TOApplication to notify the teleoperable user or vehicle (e.g., TODriver) of the updated TCs.

The network operator (e.g., OMS) is configured to carry out QoS predictions on a per-slice basis and signal any fluctuation in the offered QoS in advance to the TOApplication, based on an analysis of historical monitoring data, current measurement updates and/or a network infrastructure state.

The network operator (e.g., OMS) is configured to perform a continuous monitoring and provide a real-time feedback in fine granularity of QoS changes along the segmented geographical routes or paths, based on which the TOApplication can decide to follow alternate geographical routes or paths that can still support their respective required TCs and/or decide to generate new geographical routes or paths, if required.

In summary, the present disclosure relates to a network operator (OMS), a teleoperation application (TOApplication) and an application (TODriver) running on a teleoperable vehicle. The OMS is capable of creating a network slice for teleoperating a teleoperable vehicle along at least one route, receiving, from the TOApplication, a slice configuration request comprising the QoS for the at least one route, and configuring the network slice to support the QoS for the at least one route. The TOApplication is capable of communicating, towards the OMS, a request for creating the network slice, receiving a teleoperation service request from the teleoperable vehicle, wherein the teleoperation service request comprises a set of teleoperation configurations, mapping each teleoperation configuration to a respective QoS, and sending the slice configuration request comprising the QoS to the OMS. The TODriver is capable of sending the teleoperation service request to the TOApplication, and controlling the route to be followed by the teleoperable vehicle based on information from the TOApplication.

While the present disclosure has been illustrated and described in detail respectively in the drawings and the foregoing description, such illustration and description are to be considered illustrative or exemplary and not restrictive. The disclosure is not limited to the disclosed embodiments. From reading the present disclosure, other modifications will be apparent to a person skilled in the art. Such modifications may involve other features, which are already known in the art and may be used instead of or in addition to features already described herein.

The disclosure has been described in conjunction with various embodiments herein. However, other variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present disclosure has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present disclosure.

What is claimed is:

1. A network operator apparatus, comprising:
   a processor; and
   a memory having processor-executable instructions stored therein to be executed by the processor, wherein the processor-executable instructions cause the network operator apparatus to:
   create a network slice for teleoperating a teleoperable vehicle along at least one route;
   receive, from a teleoperation application (TOApplication) apparatus, a slice configuration request comprising a quality-of-service (QoS) for the at least one route;
   configure the network slice to support the QoS for the at least one route;
   monitor the network slice; and
   in response to the network operator apparatus detecting that it cannot maintain the QoS along the at least one route, send the TOApplication apparatus a failure message, and then perform a network-aware driving feedback loop to negotiate with the TOApplication apparatus whether to generate a new route and an associated QoS configuration in real time.

2. The network operator apparatus of claim 1, wherein the processor-executable instructions further cause the network operator apparatus to:
   monitor the network slice by monitoring performance indicators corresponding to the supported QoS.

3. The network operator apparatus of claim 1, wherein the processor-executable instructions further cause the network operator apparatus to:
   notify the TOApplication apparatus about one or more parameters of the network slice.

4. The network operator apparatus of claim 3, wherein the processor-executable instructions further cause the network operator apparatus to:
   gather at least one of ongoing or historical monitoring data of the network slice;
   predict a change in the QoS supported by the network slice, based on the at least one of ongoing or historical monitoring data of the network slice; and
   notify the TOApplication apparatus about the predicted change.

5. A teleoperation application (TOApplication) apparatus, comprising:
   a processor; and
   a memory having processor-executable instructions stored therein to be executed by the processor, wherein the processor-executable instructions cause the TOApplication apparatus to:
   communicate, towards a network operator apparatus, a request for creating a network slice for teleoperating a teleoperable vehicle along at least one route;
   receive a teleoperation service request from the teleoperable vehicle, wherein the teleoperation service request comprises a set of teleoperation configurations;
   map each teleoperation configuration of the set of teleoperation configurations to a respective quality-of-service (QoS) to obtain a QoS set;
   send a slice configuration request to the network operator apparatus, the slice configuration request comprising a QoS of the QoS set; and
   receive a failure message from the network operator apparatus, and then perform a network-aware driving feedback loop to negotiate with the network operator apparatus whether to generate a new route and an associated QoS configuration in real time, in response to the network operator apparatus detecting that it cannot maintain the QoS along the at least one route.

6. The TOApplication apparatus of claim 5, wherein each teleoperation configuration of the set of teleoperation configurations is valid for a pre-defined time period.

7. The TOApplication apparatus of claim 5, wherein the processor-executable instructions further cause the TOApplication apparatus to:
receive, from the network operator apparatus, a notification about the network slice, notifying the TOApplication apparatus about one or more parameters of the network slice.

8. The TOApplication apparatus of claim 5, wherein the processor-executable instructions further cause the TOApplication apparatus to:
receive, from the network operator apparatus, a notification about a predicted change, notifying the TOApplication apparatus about the predicted change.

9. A method applied to a network operator apparatus, the method comprising:
creating a network slice for teleoperating a teleoperable vehicle along at least one route;
receiving, from a teleoperation application (TOApplication) apparatus a slice configuration request comprising a quality-of-service (QoS) for the at least one route;
configuring the network slice to support the QoS for the at least one route;
monitoring the network slice; and
in response to the network operator apparatus detecting that it cannot maintain the QoS along the at least one route, sending the TOApplication apparatus a failure message, and then performing a network-aware driving feedback loop to negotiate with the TOApplication apparatus whether to generate a new route and an associated QoS configuration in real time.

10. The method of claim 9, further comprising monitoring the network slice by monitoring performance indicators corresponding to the supported QoS.

11. A non-transitory computer-readable storage medium having processor-executable instructions stored therein to be executed by a processor of a network operator apparatus, wherein the processor-executable instructions cause the network operator apparatus to implement the method according to claim 9.

12. A method applied to a teleoperation application (TOApplication) apparatus, the method comprising:
communicating, towards a network operator apparatus, a request for creating a network slice for teleoperating a teleoperable vehicle along at least one route;
receiving a teleoperation service request from the teleoperable vehicle, wherein the teleoperation service request comprises a set of teleoperation configurations;
mapping each teleoperation configuration of the set of teleoperation configurations to a respective quality-of-service (QoS) to obtain a QoS set;
sending a slice configuration request to the network operator apparatus, the slice configuration request comprising a QoS of the QoS set; and
receiving a failure message from the network operator apparatus, and then performing a network-aware driving feedback loop to negotiate with the network operator apparatus whether to generate a new route and an associated QoS configuration in real time, in response to the network operator apparatus detecting that it cannot maintain the QoS along the at least one route.

13. The method of claim 12, wherein each teleoperation configuration of the set of teleoperation configurations is valid for a pre-defined time period.

14. The method of claim 12, further comprising receiving, from the network operator apparatus, a notification about the network slice, notifying the TOApplication apparatus about one or more parameters of the network slice.

15. A non-transitory computer-readable storage medium having processor-executable instructions stored therein to be executed by a processor of a teleoperation application (TOApplication) apparatus, wherein the processor-executable instructions cause the TOApplication apparatus to implement the method according to claim 12.

* * * * *